(12) United States Patent
Ni et al.

(10) Patent No.: US 12,450,497 B2
(45) Date of Patent: Oct. 21, 2025

(54) MODEL OPTIMIZATION METHOD, ELECTRONIC DEVICE, AND COMPUTER PROGRAM PRODUCT

(71) Applicant: EMC IP Holding Company LLC, Hopkinton, MA (US)

(72) Inventors: Jiacheng Ni, Shanghai (CN); Zijia Wang, WeiFang (CN); Jinpeng Liu, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1102 days.

(21) Appl. No.: 17/402,769

(22) Filed: Aug. 16, 2021

(65) Prior Publication Data
US 2023/0025148 A1    Jan. 26, 2023

(30) Foreign Application Priority Data
Jul. 23, 2021  (CN) .......................... 202110838386.3

(51) Int. Cl.
*G06N 3/0985*    (2023.01)
*G06F 11/34*     (2006.01)
*G06N 20/00*     (2019.01)

(52) U.S. Cl.
CPC ....... *G06N 3/0985* (2023.01); *G06F 11/3447* (2013.01); *G06N 20/00* (2019.01)

(58) Field of Classification Search
CPC ... G06N 3/0985; G06N 20/00; G06F 11/3447
See application file for complete search history.

(56) References Cited

U.S. PATENT DOCUMENTS

2018/0329798 A1* 11/2018 Zhou .................. G06N 20/00
2019/0303787 A1* 10/2019 Dube .................. G06N 20/00
(Continued)

FOREIGN PATENT DOCUMENTS

WO   WO-2021159060 A1 *  8/2021  ............. G06N 3/084
WO   WO-2022169625 A1 *  8/2022  ............. G06N 3/126

OTHER PUBLICATIONS

Huo et al., "Large Batch Optimization for Deep Learning Using New Complete Layer-Wise Adaptive Rate Scaling" May 18, 2021, AAAI, pp. 7883-7890. (Year: 2021).*

(Continued)

*Primary Examiner* — Miranda M Huang
*Assistant Examiner* — Chase P. Hinckley
(74) *Attorney, Agent, or Firm* — Ryan, Mason & Lewis, LLP

(57) ABSTRACT

Embodiments of the present disclosure relate to a model optimization method, an electronic device, and a computer program product. This method includes: determining an initial learning rate combination for a deep learning model, wherein the initial learning rate combination includes a plurality of learning rates, each learning rate being determined for one of a plurality of layers of the deep learning model, and the plurality of learning rates including static learning rates and dynamic learning rates; and adjusting the initial learning rate combination to obtain a target learning rate combination, wherein an accuracy rate achieved when the target learning rate combination is used to train the deep learning model is higher than or equal to a first threshold accuracy rate. With the technical solution of the present disclosure, a deep learning model can be optimized by setting learning rates for each layer of the deep learning model.

20 Claims, 5 Drawing Sheets

(56) References Cited

U.S. PATENT DOCUMENTS

| | | | | |
|---|---|---|---|---|
| 2021/0089887 | A1* | 3/2021 | Johnson | G06N 3/084 |
| 2021/0209502 | A1* | 7/2021 | Vasudevan | G06F 18/217 |
| 2021/0279669 | A1* | 9/2021 | Gardner | G06Q 10/063112 |
| 2021/0287089 | A1* | 9/2021 | Mayer | G06N 3/04 |
| 2022/0083854 | A1* | 3/2022 | Willcock | G06N 3/084 |
| 2022/0261626 | A1* | 8/2022 | Liu | G06N 3/063 |
| 2022/0345717 | A1* | 10/2022 | Lin | G06N 3/084 |
| 2022/0383630 | A1* | 12/2022 | Beyer | G06V 10/7747 |
| 2023/0368038 | A1* | 11/2023 | Shen | G06N 3/086 |

OTHER PUBLICATIONS

Shen et al., "Partial is Better Than All: Revisiting Fine-tuning Strategy for Few-shot Learning" Feb. 5, 2021, U.S. Appl. No. 63/146,274, pp. 1-14. (Year: 2021).*

Ro et al., "AutoLR: Layer-wise Pruning and Auto-tuning of Learning Rates in Fine-tuning of Deep Networks" Jan. 4, 2021, arXiv: 2002.06048v3, pp. 1-10. (Year: 2021).*

Singh "Layer-Specific Adaptive Learning Rates for Deep Networks" Oct. 15, 2015, arXiv: 1510.04609v1, pp. 1-5. (Year: 2015).*

Smith et al., "On the Origin of Implicit Regularization in Stochastic Gradient Descent" Jan. 28, 2021, arXiv: 2101.12176v1, pp. 1-14. (Year: 2021).*

You "Scaling SGD Batch Size to 32K for ImageNet Training" Aug. 13, 2017, arXiv: 1708.03888v1, pp. 1-20. (Year: 2017).*

You et al., "Large Batch Optimization for Deep Learning: Training Bert in 76 Minutes" Jan. 3, 2020, arXiv: 1904.00962v5, pp. 1-37. (Year: 2020).*

Carvalho et al., "AutoLR: An Evolutionary Approach to Learning Rate Policies" Jul. 2020, pp. 1-9. (Year: 2020).*

Wu et al., "Direction Matters: On the Implicit Bias of Stochastic Gradient Descent with Moderate Learning Rate" Mar. 29, 2021, arXiv: 2011.02538v2, pp. 1-43. (Year: 2021).*

Buthulezi et al., "Learning Rate Optimsation of an Image Processing Deep Convolutional Neural Network" 2020, pp. 1-6. (Year: 2020).*

Zheng et al., "Layer-wise learning based stochastic gradient descent method for the optimization of deep convolutional neural network" 2019, pp. 5641-5654. (Year: 2019).*

Zhang et al., "Train Feedforward Neural Network with Layer-wise Adaptive Rate via Approximating Back-matching Propagation" Feb. 27, 2018, arXiv: 1802.09750v1, pp. 1-12. (Year: 2018).*

Hartman et al., "ActCooLR—High Level Learning Rate Schedules using Activation Pattern Temperature" May 28, 2021, OpenReview revisions, Anonymous, pp. 1-14. (Year: 2021).*

Ge et al., "The Step Decay Schedule: A Near Optimal, Geometrically, Decaying Learning Rate Procedure for Least Squares" Oct. 29, 2019, arXiv: 1904.12838v2, pp. 1-28. (Year: 2019).*

S. Iranmanesh et al., "A Differential Adaptive Learning Rate Method for Back-Propagation Neural Networks," World Academy of Science, Engineering and Technology, vol. 50 2009, pp. 285-288.

B. Singh et al., "Layer-Specific Adaptive Learning Rates for Deep Networks," arXiv:1510.04609v1, Oct. 15, 2015, 5 pages.

Wikipedia, "Simulated Annealing," https://en.wikipedia.org/wiki/Simulated_annealing, Jul. 21, 2021, 12 pages.

* cited by examiner

MODEL OPTIMIZATION METHOD, ELECTRONIC DEVICE, AND COMPUTER PROGRAM PRODUCT

RELATED APPLICATION(S)

The present application claims priority to Chinese Patent Application No. 202110838386.3, filed Jul. 23, 2021, and entitled "Model Optimization Method, Electronic Device, and Computer Program Product," which is incorporated by reference herein in its entirety.

FIELD

Embodiments of the present disclosure relate generally to computer technology, and specifically to a model optimization method, an electronic device, and a computer program product that can be used in the field of deep learning, and in particular in the field of deep learning model optimization.

BACKGROUND

When people wish to solve a problem using machine learning such as deep learning, there are often situations where they cannot find enough data for training the model. Using a small amount of data to train a machine learning model is likely to lead to poor training results. On the other hand, even if people have access to a large amount of data that can be used to train a machine learning model, they may not have enough computing resources such as dedicated processing units, or storage resources to train the machine learning model, and thus may not be able to obtain high-quality training results.

Transfer learning can solve the aforementioned problem by using knowledge in the form of pre-trained models. A pre-trained model can be created by using large datasets and resources, and then all layers in the pre-trained model can be fine-tuned using specific small datasets and fewer resources so as to optimize the pre-trained model. However, conventional model optimization methods are deficient in aspects such as granularity, making it difficult to effectively optimize the performance and training effect of pre-trained models.

SUMMARY

The embodiments of the present disclosure provide a model optimization method, an electronic device, and a computer program product.

In a first aspect of the present disclosure, a model optimization method is provided. This method includes: determining an initial learning rate combination for a deep learning model, wherein the initial learning rate combination includes a plurality of learning rates, each learning rate being determined for one of a plurality of layers of the deep learning model, and the plurality of learning rates including static learning rates and dynamic learning rates; and adjusting the initial learning rate combination to obtain a target learning rate combination, wherein an accuracy rate achieved when the target learning rate combination is used to train the deep learning model is higher than or equal to a first threshold accuracy rate.

In a second aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions including: determining an initial learning rate combination for a deep learning model, wherein the initial learning rate combination includes a plurality of learning rates, each learning rate being determined for one of a plurality of layers of the deep learning model, and the plurality of learning rates including static learning rates and dynamic learning rates; and adjusting the initial learning rate combination to obtain a target learning rate combination, wherein an accuracy rate achieved when the target learning rate combination is used to train the deep learning model is higher than or equal to a first threshold accuracy rate.

In a third aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

This Summary is provided to introduce the selection of concepts in a simplified form, which will be further described in the Detailed Description below. The Summary is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent from the following description of example embodiments of the present disclosure in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Figure 1:
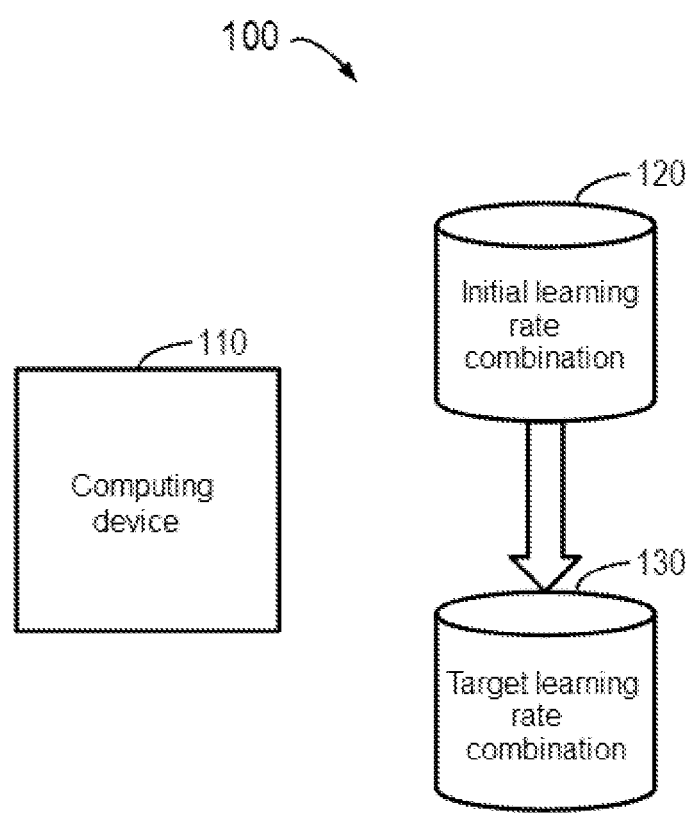
FIG. 1 illustrates a schematic diagram of model optimization environment 100 in which a device and/or a method according to embodiments of the present disclosure can be implemented.

Illustrative embodiments of the present disclosure will be described in more detail below with reference to the accompanying drawings. Although illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other definitions, both explicit and implicit, may be included below.

As described above in the Background section, transfer learning can address situations where there are insufficient datasets or computing and storage resources for training machine learning models by using knowledge in the form of pre-trained models.

Specifically, transfer learning is a process of using knowledge learned in a process/activity and applying it to a different task. For example, a player who is good at caroms could apply such knowledge to learning how to play a game of billiards.

Going back to machine learning such as deep learning, if the task of model A is to identify 1000 objects, such as hats, cats, mats, etc., we have such trained models on hand. Now, suppose we want to create model B to detect a cat/dog classifier. Even though we have a small dataset, we can use the knowledge of model A during the training of model B and produce the current optimal result.

An example network diagram of a convolutional neural network can be used to understand transfer learning. Although the network of a convolutional neural network is large and complex in practice, and contains various other units, when transfer learning is used, pre-trained models that are pre-trained using large datasets can be used and all layers of the network of the convolutional neural network can be fine-tuned using small, user-specific datasets, thereby implementing transfer learning for the convolutional neural network.

However, conventional model optimization methods are inadequate in terms of granularity when fine-tuning a pre-trained model such as a deep learning model after transfer, and therefore it is difficult to effectively optimize the performance and training effect of the pre-trained model, which may affect the user experience of users using the pre-trained model.

In order to at least partially solve one or more of the above problems and other potential problems, illustrative embodiments of the present disclosure provide a model optimization method. With this method, the differential learning rate can be extended by a mixed differential learning rate during the fine-tuning stage. For example, for each layer of the deep learning model, the learning rate during fine-tuning can be a fixed static learning rate or a dynamic learning rate. In addition, with this method, a metaheuristic approach can be used to find a mixed optimal layer-specific learning rate strategy. For example, simulated annealing can be used as a hyper-parameter optimizer to search for a mixed optimal layer-specific learning rate strategy.

The "differential learning rate" refers to setting different learning rates for different layers of the model during the training of the model. Alternatively, the layers of the model can be divided into different groups of layers and different learning rates can be set for each group. Adopting the above method helps to obtain desired results during the model training stage. In other words, the "differential learning rate" means that the weight change rate of each layer during model training is controlled by setting different learning rates for different layers or groups of layers of the model during the model training stage.

In general, a deep learning model for image classification, for example, consists of a plurality of layers, where at least one initial layer can be used to learn generic features such as edges, shapes, etc., at least one intermediate layer can learn specific details related to the training dataset, and at least one end layer can be used to learn more coarse features. Thus, by not changing the learning weights of the initial layers too much, as they are already usually competent to detect features such as edges, for example. Thus, the intermediate layer will have complex features, and thus if their learning weights are slightly modified, these features may contribute to some extent to the optimization of the model. Thus, some fine-tuning of the learning rate of the intermediate layer can be conducted. The end layer can have smaller learning weights compared with the intermediate layer. Since learning weights can be inversely proportional to learning rates, different learning rates can be set for the initial, intermediate, and end layers of a deep learning model for image classification. The learning rate of the initial layer can be very low, the learning rate of the intermediate layer will be higher than that of the initial layer, and the final end layer will have the highest learning rate.

The level of the learning rates of the initial and intermediate layers can depend on the data correlation between the pre-trained model and the desired model. For example, if the task is to create a dog/cat classifier and the pre-trained model is already good at recognizing cats, a low learning rate can be used. However, if the task is to create some models on satellite images or medical images, a slightly higher learning rate will be used.

As previously described, the model optimization method provided in embodiments of the present disclosure can use a mixed differential learning rate and can use a metaheuristic approach to find a mixed optimal layer-specific learning rate strategy. The model optimization method according to the embodiments of the present disclosure will be described specifically below with reference to the accompanying drawings.

FIG. 1 illustrates a schematic block diagram of model optimization environment 100 in which a model optimization method in some embodiments of the present disclosure can be implemented. According to an embodiment of the present disclosure, model optimization environment 100 may be a cloud environment.

In the model optimization environment 100 as shown in FIG. 1, computing device 110 can determine initial learning rate combination 120 for a deep learning model and can adjust initial learning rate combination 120 to obtain target learning rate combination 130.

In addition, computing device 110 can also receive external inputs, including, for example, receiving a deep learning model, an initial accuracy rate of the deep learning model, a predetermined learning rate set, parameters for training the deep learning model, a predetermined value set for the parameters used to train the deep learning model, and the like. Computing device 110 can determine initial learning rate combination 120 based on the received external inputs, and adjust initial learning rate combination 120, so as to obtain target learning rate combination 130, wherein an accuracy rate achieved when target learning rate combination 130 is used to train the deep learning model is higher than or equal to a first threshold accuracy rate. Computing device 110 can also adjust, based on the received external inputs, initial learning rate combination 120 and values of parameters used to train the deep learning model, so as to obtain target learning rate combination 130 and target values of the parameters, wherein an accuracy rate achieved when target learning rate combination 130 and the target values of the parameters are used to train the deep learning model is higher than or equal to a second threshold accuracy rate.

In addition, computing device 110 can also determine the values of the first threshold accuracy rate and the second threshold accuracy rate.

It should be understood that model optimization environment 100 is merely an example and not limiting, and that it is scalable or constrainable. For example, more computing devices may be included in model optimization environment 100 such that the need for more users to simultaneously utilize more computing devices to determine more initial learning rate combinations and obtain more target learning rate combinations can be met.

Figure 2:
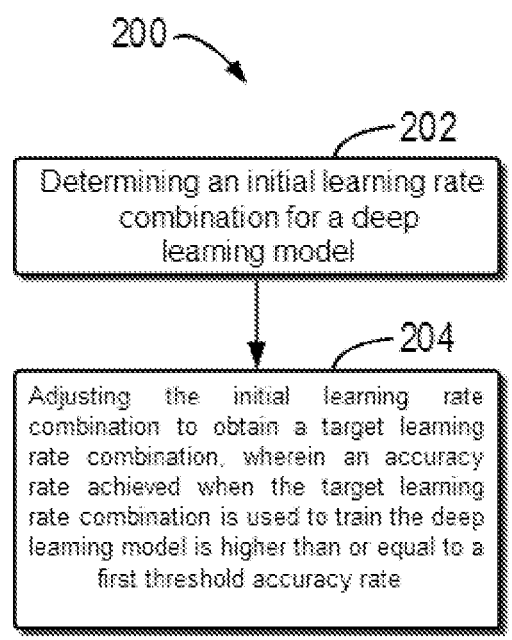
FIG. 2 illustrates a flow chart of model optimization method 200 according to an embodiment of the present disclosure.
Figure 4:
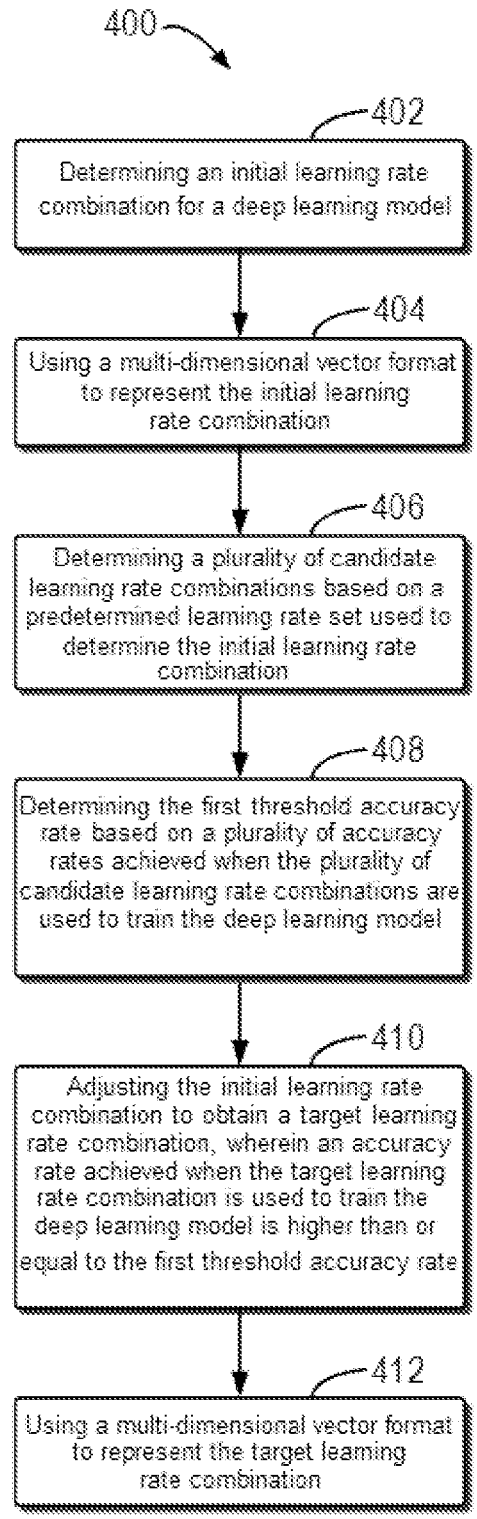
FIG. 4 illustrates a flow chart of model optimization method 400 according to an embodiment of the present disclosure.

Model optimization method 200 and model optimization method 400 shown in FIGS. 2 and 4 are illustrated below using computing device 110, initial learning rate combination 120, and target learning rate combination 130 included in FIG. 1 as examples.

FIG. 2 illustrates a flow chart of model optimization method 200 according to an embodiment of the present disclosure. Model optimization method 200 may be implemented by computing device 110 shown in FIG. 1, or by other appropriate devices. It should be understood that model optimization method 200 may also include additional steps not shown and/or may omit the steps shown, and the scope of the embodiments of the present disclosure is not limited in this regard.

At block 202, computing device 110 determines initial learning rate combination 120 for a deep learning model. According to an embodiment of the present disclosure, initial learning rate combination 120 includes a plurality of learning rates, each learning rate being determined for one of a plurality of layers of the deep learning model, and the plurality of learning rates include static learning rates and dynamic learning rates.

For example, assume that the deep learning model includes 5 layers and that in this deep learning model, initially, a first layer has a static learning rate of a first specific value, a second layer has a static learning rate of a second specific value, a third layer has a static learning rate of a third specific value, a fourth layer has a first dynamic learning rate, and a fifth layer has a second dynamic learning rate. At this point, initial learning rate combination 120 for this deep learning model is: the combination of the static learning rate of the first specific value, the static learning rate of the second specific value, the static learning rate of the third specific value, the first dynamic learning rate, and the second dynamic learning rate.

According to an embodiment of the present disclosure, the dynamic learning rates may include a periodic learning rate and a hot restart learning rate.

According to an embodiment of the present disclosure, determining initial learning rate combination 120 for the deep learning model includes determining, for each of the plurality of layers, a learning rate from a predetermined learning rate set. For example, the predetermined learning rate set may include: a static learning rate with a value of 0.05, a static learning rate with a value of 0.1, a static learning rate with a value of 0.25, a static learning rate with a value of 0.5, a first dynamic learning rate as a periodic learning rate, and a second dynamic learning rate as a hot restart learning rate. By utilizing the predetermined learning rate set, the range of values for the learning rates in initial learning rate combination 120 can be reduced, which can result in a more efficient model optimization process.

At block 204, computing device 110 adjusts initial learning rate combination 120 to obtain target learning rate combination 130, wherein an accuracy rate achieved when target learning rate combination 130 is used to train the deep learning model is higher than or equal to a first threshold accuracy rate.

According to an embodiment of the present disclosure, computing device 110 can, for example, use a simulated annealing algorithm to adjust initial learning rate combination 120.

The simulated annealing (SA) algorithm simulates the physical annealing process and can be used to optimize parameters such as learning rates in a deep learning model. The simulated annealing algorithm is useful in cases where there are many local minima, as in such cases algorithms such as gradient reduction, for example, may get stuck.

Figure 3:
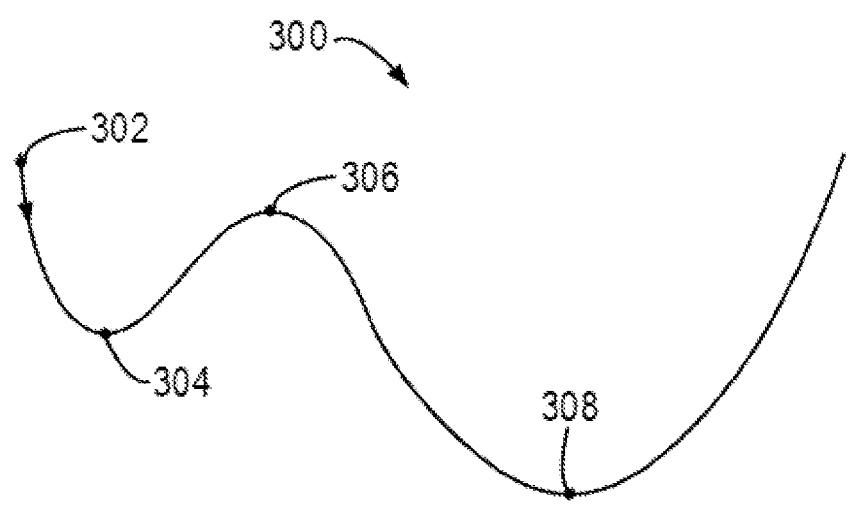
FIG. 3 illustrates a schematic diagram of local minimum problem curve 300 according to an embodiment of the present disclosure.

FIG. 3 illustrates a schematic diagram of local minimum problem curve 300 according to an embodiment of the present disclosure. As described in FIG. 3, local minimum problem curve 300 includes start point 302, local minimum point 304, local high point 306, and global minimum point 308, and the direction of gradient reduction is indicated in local minimum problem curve 300 from start point 302 to local minimum point 304.

In local minimum problem curve 300 shown in FIG. 3, due to the presence of local high point 306, when the gradient descent is performed from start point 302, the gradient reduction will get stuck at local minimum point 304 and cannot reach global minimum point 308.

As mentioned before, a simulated annealing algorithm can be used to overcome this problem.

First, start with the initial solution $s=s_0$. This can be any solution that meets the criteria for an acceptable solution. Moreover, the simulated annealing algorithm can be performed starting from the initial temperature $t=t_0$.

After that, a temperature reduction function is set. Usually, three main types of temperature reduction rules can be used as follows:

the linear reduction rule, $t=t-\alpha$;
the geometric reduction rule, $t=t*\alpha$; and
the slow reduction rule, $$t = \frac{t}{1+\beta t}.$$

Each of the aforementioned reduction rules can reduce the temperature at a different rate, and each method is better at optimizing different types of models. In the linear and geometric reduction rules, $\alpha$ provides a temperature reduction function. For the slow reduction rule, $\beta$ can be any constant.

Starting from the initial temperature, the process described below is performed cyclically for n iterations, and the temperature is reduced according to the temperature reduction rule. This cyclical iteration ends when a termination condition is reached. The termination condition may be reaching a certain final temperature, reaching an acceptable performance threshold for a given parameter set, etc. The mapping of time to temperature and the rate at which the temperature is reduced are called an annealing schedule.

Given a solution neighborhood N(s), one of the solutions is selected and the cost difference between the old solution and the new neighboring solution is calculated. The neighborhood of the solution is all solutions that are close to the solution. For example, a neighborhood of a set of five parameters may have one of the five parameters changed but the remaining four parameters left unchanged.

If the cost difference between the new and old solutions is greater than 0, which indicates that the new solution is better, the new solution is accepted. If the cost difference between the old and new solutions is less than 0, which indicates that the old solution is better, a random number between 0 and 1 is generated, and is accepted if it is lower than the value calculated from an energy magnitude equation used in physical annealing.

In the case of simulated annealing, such an equation is modified to the following:

$$P = \begin{cases} 1 & \text{if } \Delta c \leq 0 \\ e^{-\Delta c/t} & \text{if } \Delta c > 0 \end{cases}$$

where $\Delta c$ is the change in cost, and t is the current temperature.

The calculated P in this case is the probability that we should accept the new solution.

Thus, based on the above description of the simulated annealing algorithm, when computing device 110 uses the simulated annealing algorithm to adjust initial learning rate combination 120, random increments can be used to adjust the static learning rates in initial learning rate combination 120, and random flips can be used to adjust the dynamic learning rates in initial learning rate combination 120.

According to an embodiment of the present disclosure, computing device 110 can determine the first threshold accuracy rate based on an initial accuracy rate of the deep learning model. For example, computing device 110 can determine the first threshold accuracy rate to be a predetermined value, e.g., 1%, higher than the initial accuracy rate of the deep learning model, or can determine the first threshold accuracy rate to be a predetermined multiple, e.g., 1.01 times, of the initial accuracy rate of the deep learning model. In this case, it is possible for computing device 110 to obtain a plurality of target learning rate combinations 130 that are higher than or equal to the first threshold accuracy rate by adjusting initial learning rate combination 120.

According to an embodiment of the present disclosure, computing device 110 can adjust initial learning rate combination 120 and values of parameters used to train the deep learning model, so as to obtain target learning rate combination 130 and target values of the parameters, wherein an accuracy rate achieved when target learning rate combination 130 and the target values of the parameters are used to train the deep learning model is higher than or equal to a second threshold accuracy rate. The parameters used to train the deep learning model may include, for example, at least one of: a training batch size for training the deep learning model; the number of iterations of a simulated annealing algorithm for adjusting initial learning rate combination 120; and a temperature reduction pattern for the simulated annealing algorithm.

By simultaneously adjusting initial learning rate combination 120 and the values of the parameters used to train the deep learning model, the deep learning model can be optimized more efficiently and precisely.

According to an embodiment of the present disclosure, the second threshold accuracy rate can be higher than the first threshold accuracy rate, and computing device 110 can likewise determine the second threshold accuracy rate based on the initial accuracy rate of the deep learning model.

According to an embodiment of the present disclosure, computing device 110 can adjust the values of the parameters based on a predetermined value set for the parameters. By utilizing the predetermined value set for the parameters, the range of values for the parameters in initial learning rate combination 120 can be reduced, which can result in a more efficient model optimization process.

FIG. 4 illustrates a flow chart of model optimization method 400 according to an embodiment of the present disclosure. Model optimization method 400 may be implemented by computing device 110 shown in FIG. 1, or by other appropriate devices. It should be understood that model optimization method 400 may also include additional steps not shown and/or may omit the steps shown, and the scope of the embodiments of the present disclosure is not limited in this regard.

At block 402, computing device 110 determines initial learning rate combination 120 for a deep learning model. According to an embodiment of the present disclosure, initial learning rate combination 120 includes a plurality of learning rates, each learning rate being determined for one of a plurality of layers of the deep learning model, and the plurality of learning rates include static learning rates and dynamic learning rates. The content involved in block 402 is the same as that involved in block 202, and will not be repeated here.

At block 404, computing device 110 uses a multi-dimensional vector format to represent initial learning rate combination 120. According to an embodiment of the present disclosure, representing initial learning rate combination 120 in a multi-dimensional vector format can facilitate more efficient use of algorithms such as simulated annealing algorithms, because the multi-dimensional vector format is more suitable as an input and output format for these algorithms. For example, assume that initial learning rate combination 120 includes 7 learning rates, which are respectively: a static learning rate with a value of 0.05, a static learning rate with a value of 0.1, a static learning rate with a value of 0.05, a static learning rate with a value of 0.25, a static learning rate with a value of 0.5, a first dynamic learning rate as a periodic learning rate, and a second dynamic learning rate as a hot restart learning rate. In this case, the number 0 can be used to represent the first dynamic learning rate as the periodic learning rate, and the number 1 can be used to represent the second dynamic learning rate as the hot restart learning rate. With such a representation manner, the aforementioned initial learning rate combination 120 can be represented as a multi-dimensional vector in the form (0.05, 0.1, 0.05, 0.25, 0.5, 0, 1).

At block 406, computing device 110 determines a plurality of candidate learning rate combinations based on a predetermined learning rate set used to determine initial learning rate combination 120. According to an embodiment of the present disclosure, it is assumed that initial learning rate combination 120 includes 7 learning rates and that the predetermined learning rate set includes 6 predetermined learning rates: a static learning rate with a value of 0.05, a static learning rate with a value of 0.1, a static learning rate with a value of 0.25, a static learning rate with a value of 0.5, a first dynamic learning rate as a periodic learning rate, and a second dynamic learning rate as a hot restart learning rate. At this point, each learning rate in the candidate learning rate combinations has 6 different predetermined learning rate options, so that the candidate learning rate combinations can include up to $6^7$ different candidate learning rate combinations.

At block 408, computing device 110 determines the first threshold accuracy rate based on a plurality of accuracy rates achieved when the plurality of candidate learning rate combinations are used to train the deep learning model.

According to some embodiments of the present disclosure, computing device 110 can determine the highest accuracy rate among the plurality of accuracy rates achieved when the plurality of candidate learning rate combinations are used to train the deep learning model as the first threshold accuracy rate.

According to some other embodiments of the present disclosure, computing device 110 can determine the lowest accuracy rate of the top several highest accuracy rates among the plurality of accuracy rates achieved when the plurality of candidate learning rate combinations are used to train the deep learning model as the first threshold accuracy rate.

According to some further embodiments of the present disclosure, computing device 110 can determine the average of the top several highest accuracy rates among the plurality of accuracy rates achieved when the plurality of candidate learning rate combinations are used to train the deep learning model as the first threshold accuracy rate.

At block 410, computing device 110 adjusts initial learning rate combination 120 to obtain target learning rate combination 130, wherein an accuracy rate achieved when target learning rate combination 130 is used to train the deep learning model is higher than or equal to a first threshold accuracy rate. The content involved in block 410 is the same as that involved in block 204, and will not be repeated here.

It should be noted that when, in block 408, computing device 110 determines the highest accuracy rate among the plurality of accuracy rates achieved when the plurality of candidate learning rate combinations are used to train the deep learning model as the first threshold accuracy rate, computing device 110 can only obtain one target learning rate combination 130 by adjusting initial learning rate combination 120, and at this point, an accuracy rate achieved when target learning rate combination 130 is used to train the deep learning model is equal to the first threshold accuracy rate.

When, at block 408, computing device 110 determines the lowest accuracy rate of the top several highest accuracy rates among the plurality of accuracy rates achieved when the plurality of candidate learning rate combinations are used to train the deep learning model as the first threshold accuracy rate, it is possible for computing device 110 to obtain a plurality of target learning rate combinations 130 that are higher than or equal to the first threshold accuracy rate by adjusting initial learning rate combination 120.

When, at block 408, computing device 110 determines the average of the top several highest accuracy rates among the plurality of accuracy rates achieved when the plurality of candidate learning rate combinations are used to train the deep learning model as the first threshold accuracy rate, it is also possible for computing device 110 to obtain a plurality of target learning rate combinations 130 that are higher than or equal to the first threshold accuracy rate by adjusting initial learning rate combination 120, but at this point, the number of target learning rate combinations 130 obtained will typically be less than the number of target learning rate combinations 130 obtained when the lowest accuracy rate of the top several highest accuracy rates among the plurality of accuracy rates achieved when the plurality of candidate learning rate combinations are used to train the deep learning model is determined to be the first threshold accuracy rate.

According to an embodiment of the present disclosure, when computing device 110 simultaneously adjusts initial learning rate combination 120 and the values of the parameters used to train the deep learning model, computing device 110 can first determine the plurality of candidate learning rate combinations based on the predetermined learning rate set used to determine initial learning rate combination 120, and determine a plurality of candidate values for the parameters based on a predetermined value set for the parameters that is used to determine the values of the parameters. After that, computing device 110 can form a plurality of combinations by combining each of the plurality of candidate learning rate combinations with each of the plurality of candidate values; and finally, computing device 110 determines the second threshold accuracy rate based on a plurality of accuracies achieved when the plurality of combinations are used to train the deep learning model.

At this point, computing device 100 can also determine the highest accuracy rate among the plurality of accuracy rates as the first threshold accuracy rate, determine the lowest accuracy rate of the top several highest accuracy rates among the plurality of accuracy rates as the first threshold accuracy rate, or determine the average of the top several highest accuracy rates among the plurality of accuracy rates as the first threshold accuracy rate.

At block 412, computing device 110 uses a multi-dimensional vector format to represent target learning rate combination 130. The content involved in block 412 is similar to that involved in block 404, and will not be repeated here.

It should be understood that model optimization method 400 includes more steps than model optimization method 200 and can be considered an extension of model optimization method 200.

With reference to FIGS. 1 to 4, a description is provided above as to contents related to model optimization environment 100 in which a device and/or method according to embodiments of the present disclosure can be implemented, model optimization method 200 according to embodiments of the present disclosure, and model optimization method 400 according to embodiments of the present disclosure. It should be understood that the above description is to better demonstrate the content recorded in the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes can be arbitrarily set as needed without affecting the normal implementation of the embodiments of the present disclosure.

Through the description above with reference to FIGS. 1 to 4, according to the technical solutions of the embodiments of the present disclosure, a model optimization method is provided. With the model optimization method provided in embodiments of the present disclosure, a deep learning model can be optimized by setting learning rates including static learning rates and dynamic learning rates for each layer of the deep learning model, so that the performance and training effect of the deep learning model can be improved, thereby helping improve the user experience of users using the deep learning model.

The technical solution according to the embodiments of the present disclosure will be illustrated step-by-step below by taking a face recognition artificial intelligence task as an example.

First, a large dataset such as ImageNet and computing resources such as dedicated processing units as well as storage resources are used to pre-train a deep learning model as a face recognition model.

To pre-train the face recognition model, a CASIA-webface dataset with the size of 4 GB is selected, which is the second largest public dataset available for face validation and recognition problems and includes 494,000 images and three-dimensional facial data of 10,500 people.

Through 4 dedicated processing units on a server, for example, Inception-Resnet-V2 is trained using CASIA-webface to classify 10,500 people. The pre-trained model is a 215 MB file which includes 55,873,736 model parameters and 572 layers.

Afterwards, a small dataset can be collected for the face recognition task. For this purpose, the Labeled Faces in the Wild (LFW) face dataset can be used as the small dataset, which includes 13,233 images of 5,749 people collected from the network. We split a validation set ($LFW_{val}$) and a training set ($LFW_{train}$) from the dataset LFW.

In this example, 158 images of more than 10 people from the LFW are selected as the total dataset, and 4 images are randomly sampled from the total dataset for each person to construct the validation set $LFW_{val}$, wherein the validation set $LFW_{val}$ includes 158 people with a total of 632 images, and the training set $LFW_{train}$ includes 158 people with a total of 3,692 images.

After training and validation, the accuracy rate of the pre-trained model is 97.4%.

Next, a mixed layer-specific learning rate strategy is determined, wherein the solution is encoded as an n-dimensional vector.

For each layer, the learning rate strategy can be a fixed static learning rate of: 0.005, 0.01, 0.05, and 0.1, or a dynamic learning rate strategy during fine-tuning: a cyclic learning rate strategy (0), and a hot restart (1).

Therefore, one example of a learning rate strategy code is (0.1, 0.5, 0.25, 0.1, 0.05, 0, 0, 1, 1, 1).

Finally, several different batch size values can be chosen, and for each batch size value, simulated annealing is used to search for the best combination of learning rate strategies specific to the layer. The objective function calculation for each encoded solution requires fine-tuning the deep learning model on the training set $LFW_{train}$ and then validating the fine-tuned deep learning model on the validation set $LFW_{val}$, where the validation result is the objective function value.

In the case where the training batch size for training the deep learning model is set to 16, the number of iterations of the simulated annealing algorithm for adjusting initial learning rate combination 120 is set to 100, and the temperature reduction pattern for the simulated annealing algorithm is set to linear reduction from 100 degrees to 1 degree, the accuracy rate that can be achieved by adopting a mixed layer-specific learning rate strategy is 99.1%, which is higher than the accuracy rate of 98.5% that can be achieved by only adopting a fixed static learning rate, and higher than the initial accuracy rate of 97.4% of the pre-trained model itself. It can thus be seen that the pre-trained model can be effectively optimized using the technical solution in the embodiments of the present disclosure.

Figure 5:
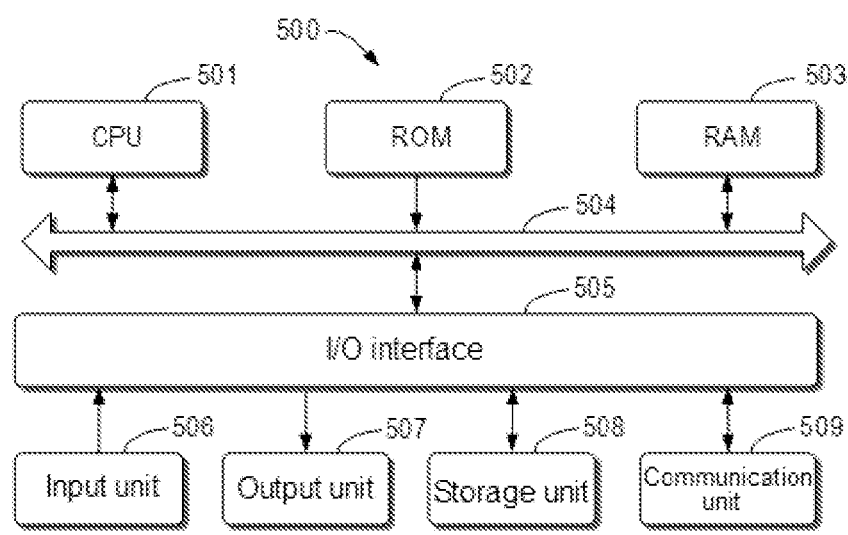
FIG. 5 illustrates a schematic block diagram of example device 500 that can be used to implement embodiments of the present disclosure.

FIG. 5 illustrates a schematic block diagram of example device 500 that can be used to implement the embodiments of the present disclosure. According to an embodiment of the present disclosure, computing device 110 in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as model optimization methods 200 and 400, may be performed by CPU 501. For example, in some embodiments, model optimization methods 200 and 400 may be implemented as a computer software program that is tangibly included in a machine-readable medium such as storage unit 508. In some embodiments, part or all of the computer program may be loaded and/or installed to device 500 via ROM 502 and/or communication unit 509. When the computer program is loaded to RAM 503 and executed by CPU 501, one or more actions of model optimization methods 200 and 400 described above may be executed.

The embodiments of the present disclosure may relate to a method, a device, a system, and/or a computer program product. The computer program product may include a computer-readable storage medium on which computer-readable program instructions for performing various aspects of the embodiments of the present disclosure are carried.

The computer-readable storage medium may be a tangible device that may hold and store instructions used by an instruction-executing device. An example of the computer-readable storage medium may include, but is not limited to, an electrical storage device, a magnetic storage device, an optical storage device, an electromagnetic storage device, a semiconductor storage device, or any suitable combination thereof. More specific examples of the computer-readable storage medium as a non-exhaustive list include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or server. In a case where a remote computer is involved, the remote computer may be connected to a user computer over any kind of networks, including a local area network (LAN) or a wide area network (WAN), or may be connected to an external computer, for example, connected through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the embodiments of the present disclosure.

Various aspects of the embodiments of the present disclosure are described here with reference to the flow charts and/or block diagrams of the method, the device/system, and the computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method, comprising:
   determining an initial learning rate combination for a deep learning model in a processor-based machine learning system, wherein the initial learning rate combination comprises a plurality of learning rates, each learning rate being determined for one of a plurality of layers of the deep learning model, and the plurality of learning rates comprising static learning rates and dynamic learning rates;
   generating a coded representation of the initial learning rate combination in the processor-based machine learning system, wherein the coded representation comprises a plurality of entries for respective ones of the layers of the deep learning model, with each of the entries being configured to include a value denoting a particular selected one of the static learning rates and the dynamic learning rates for its corresponding one of the layers;

adjusting the initial learning rate combination in the processor-based machine learning system to obtain a target learning rate combination, by application of an annealing algorithm of the processor-based machine learning system to the coded representation;

training the deep learning model in the processor-based machine learning system utilizing the target learning rate combination; and performing a recognition task in the processor-based machine learning system utilizing the trained deep learning model;

wherein an accuracy rate achieved by the processor-based machine learning system for the recognition task when the target learning rate combination is used to train the deep learning model is higher than or equal to a first threshold accuracy rate.

2. The method according to claim 1, wherein the dynamic learning rates comprise at least one of:

a periodic learning rate; and a hot restart learning rate.

3. The method according to claim 1, further comprising:

using a multi-dimensional vector format to represent at least one of:

the initial learning rate combination; and the target learning rate combination.

4. The method according to claim 1, wherein adjusting the initial learning rate combination comprises:

adjusting the initial learning rate combination using a simulated annealing algorithm.

5. The method according to claim 4, wherein adjusting the initial learning rate combination using a simulated annealing algorithm comprises:

adjusting the static learning rates in the initial learning rate combination using random increments; and adjusting the dynamic learning rates in the initial learning rate combination using random flips.

6. The method according to claim 1, further comprising:

determining the first threshold accuracy rate based on an initial accuracy rate of the deep learning model.

7. The method according to claim 1, wherein determining an initial learning rate combination for a deep learning model comprises:

determining, for each of the plurality of layers, a learning rate from a predetermined learning rate set.

8. The method according to claim 1, further comprising:

determining a plurality of candidate learning rate combinations based on a predetermined learning rate set used to determine the initial learning rate combination; and determining the first threshold accuracy rate based on a plurality of accuracy rates achieved when the plurality of candidate learning rate combinations are used to train the deep learning model.

9. The method according to claim 1, wherein adjusting the initial learning rate combination comprises:

adjusting the initial learning rate combination and values of parameters used to train the deep learning model to obtain the target learning rate combination and target values of the parameters, wherein an accuracy rate achieved when the target learning rate combination and the target values of the parameters are used to train the deep learning model is higher than or equal to a second threshold accuracy rate.

10. The method according to claim 9, wherein the parameters comprise at least one of:

a training batch size for training the deep learning model;

the number of iterations of a simulated annealing algorithm for adjusting the initial learning rate combination; and a temperature reduction pattern for the simulated annealing algorithm.

11. The method according to claim 9, wherein adjusting the values of the parameters comprises:

adjusting the values of the parameters based on a predetermined value set for the parameters.

12. The method according to claim 9, further comprising:

determining a plurality of candidate learning rate combinations based on a predetermined learning rate set used to determine the initial learning rate combination;

determining a plurality of candidate values for the parameters based on a predetermined value set for the parameters that is used to determine the values of the parameters;

forming a plurality of combinations by combining each of the plurality of candidate learning rate combinations with each of the plurality of candidate values; and determining the second threshold accuracy rate based on a plurality of accuracy rates achieved when the plurality of combinations are used to train the deep learning model.

13. An electronic device, comprising:

at least one processing unit; and at least one memory coupled to the at least one processing unit and storing instructions for execution by the at least one processing unit, wherein the instructions, when executed by the at least one processing unit, cause the device to perform actions comprising:

determining an initial learning rate combination for a deep learning model in a processor-based machine learning system, wherein the initial learning rate combination comprises a plurality of learning rates, each learning rate being determined for one of a plurality of layers of the deep learning model, and the plurality of learning rates comprising static learning rates and dynamic learning rates;

generating a coded representation of the initial learning rate combination in the processor-based machine learning system, wherein the coded representation comprises a plurality of entries for respective ones of the layers of the deep learning model, with each of the entries being configured to include a value denoting a particular selected one of the static learning rates and the dynamic learning rates for its corresponding one of the layers;

adjusting the initial learning rate combination in the processor-based machine learning system to obtain a target learning rate combination, by application of an annealing algorithm of the processor-based machine learning system to the coded representation;

training the deep learning model in the processor-based machine learning system utilizing the target learning rate combination; and performing a recognition task in the processor-based machine learning system utilizing the trained deep learning model;

wherein an accuracy rate achieved by the processor-based machine learning system for the recognition task when the target learning rate combination is used to train the deep learning model is higher than or equal to a first threshold accuracy rate.

14. The electronic device according to claim 13, wherein the dynamic learning rates comprise at least one of:
a periodic learning rate; and
a hot restart learning rate.

15. The electronic device according to claim 13, wherein the actions further comprise:
using a multi-dimensional vector format to represent at least one of:
the initial learning rate combination; and
the target learning rate combination.

16. The electronic device according to claim 13, wherein adjusting the initial learning rate combination comprises:
adjusting the initial learning rate combination using a simulated annealing algorithm.

17. The electronic device according to claim 16, wherein adjusting the initial learning rate combination using a simulated annealing algorithm comprises:
adjusting the static learning rates in the initial learning rate combination using random increments; and
adjusting the dynamic learning rates in the initial learning rate combination using random flips.

18. The electronic device according to claim 13, wherein the actions further comprise:
determining the first threshold accuracy rate based on an initial accuracy rate of the deep learning model.

19. The electronic device according to claim 13, wherein determining an initial learning rate combination for a deep learning model comprises:
determining, for each of the plurality of layers, a learning rate from a predetermined learning rate set.

20. A computer program product tangibly stored on a non-transitory computer-readable medium and comprising machine-executable instructions, wherein the machine-executable instructions, when executed by a machine, cause the machine to perform actions comprising:
determining an initial learning rate combination for a deep learning model in a processor-based machine learning system, wherein the initial learning rate combination comprises a plurality of learning rates, each learning rate being determined for one of a plurality of layers of the deep learning model, and the plurality of learning rates comprising static learning rates and dynamic learning rates;
generating a coded representation of the initial learning rate combination in the processor- based machine learning system, wherein the coded representation comprises a plurality of entries for respective ones of the layers of the deep learning model, with each of the entries being configured to include a value denoting a particular selected one of the static learning rates and the dynamic learning rates for its corresponding one of the layers;
adjusting the initial learning rate combination in the processor-based machine learning system to obtain a target learning rate combination, by application of an annealing algorithm of the processor-based machine learning system to the coded representation;
training the deep learning model in the processor-based machine learning system utilizing the target learning rate combination; and
performing a recognition task in the processor-based machine learning system utilizing the trained deep learning model;
wherein an accuracy rate achieved by the processor-based machine learning system for the recognition task when the target learning rate combination is used to train the deep learning model is higher than or equal to a first threshold accuracy rate.

* * * * *